United States Patent [19]
Osterried et al.

[11] Patent Number: 5,815,902
[45] Date of Patent: Oct. 6, 1998

[54] ROTARY TRANSFER MACHINE

[75] Inventors: Otto Osterried, Pfronten; Josef Wintergerst, Hawangen; Helmut Berger, Ottobeuren, all of Germany

[73] Assignee: Ottobeurer Facondreherei Alois Berger, Germany

[21] Appl. No.: 785,934

[22] Filed: Jan. 22, 1997

[51] Int. Cl.[6] .............. B23Q 7/02; B23P 23/00; B23B 13/04
[52] U.S. Cl. .......... 29/38 A; 29/27 C; 29/38 B; 29/563; 82/124; 82/129
[58] Field of Search ................ 29/38 A, 38 B, 29/38 C, 38 R, 563, 564, 27 R, 27 C; 408/44, 43, 50; 82/129, 120, 121, 124

[56] References Cited

U.S. PATENT DOCUMENTS

| | | | |
|---|---|---|---|
| 2,912,892 | 11/1959 | Hoern | 29/38 A X |
| 3,609,838 | 10/1971 | Wiest | 408/44 X |
| 3,955,258 | 5/1976 | Fusch | 29/38 R |
| 4,152,566 | 5/1979 | Mägerle | 29/38 X |
| 4,163,312 | 8/1979 | Matsuno et al. | 29/563 |
| 4,301,581 | 11/1981 | Bador et al. | 29/38 C |
| 4,520,595 | 6/1985 | Diener | 29/563 X |
| 4,642,861 | 2/1987 | Riley et al. | 29/38 A |
| 5,261,148 | 11/1993 | Ettori | 29/38 B |
| 5,452,502 | 9/1995 | Walter et al. | 29/38 B |

FOREIGN PATENT DOCUMENTS

| | | | |
|---|---|---|---|
| 936176 | 11/1955 | Germany | 29/562 |
| 2745382A1 | 4/1978 | Germany | . |
| 19533320 | 3/1997 | Germany | 29/38 A |
| 31511 | 3/1980 | Japan | 29/564 |
| 361192453 | 8/1986 | Japan | 29/563 |
| 197706 | 12/1976 | U.S.S.R. | 29/38 A |
| 788113 | 12/1957 | United Kingdom | 29/564 |

OTHER PUBLICATIONS

Mikron, "Multifactor Das Automatisationssystem", pp. 1–20.

*Primary Examiner*—William R. Briggs
*Attorney, Agent, or Firm*—Rothwell, Figg, Ernst & Kurz, p.c.

[57] ABSTRACT

The rotary transfer machine for machining a workpiece using fixed-cycle control has a centrally disposed rotary indexing table which is driven according to a fixed cycle, can rotate about a vertical axis and at the outer circumference of which a plurality of clamping means for holding a workpiece are disposed radially at a spacing from one another, and a plurality of machining units for machining the workpieces, which units are disposed around the outer circumference of the rotary table such that they lie substantially opposite corresponding clamping means in an indexed position of the rotary indexing table. In order to shorten the change-over time for new parts which are to be finished and enable parts to be produced with a high degree of precision, at least one machining unit comprises a main clamping device for holding a workpiece which can travel in the direction of the longitudinal axis of the corresponding clamping means and rotate about a rotational axis which is coaxial with or parallel to the longitudinal axis of the clamping means, and an auxiliary carrier device with a toolholder for a tool for manipulating or machining the workpiece. The movements of the main clamping device and of the auxiliary carrier device are effected under CNC control and can therefore be programmed.

10 Claims, 8 Drawing Sheets

ROTARY TRANSFER MACHINE

BACKGROUND OF THE INVENTION

1. Field of the Invention

The invention relates to a rotary transfer machine for machining a workpiece using fixed-cycle control, with a centrally disposed rotary indexing table which is driven according to a fixed cycle, can rotate about a vertical axis and at the outer circumference of which a plurality of clamping means for holding a workpiece are disposed radially at a spacing from one another, and with a plurality of machining units for machining the workpieces, which units are disposed around the outer circumference of the rotary indexing table such that they lie substantially opposite corresponding clamping means in an indexed position of the rotary indexing table.

2. Description of the Related Art

A rotary transfer machine of this kind is known from, for example, the leaflet "MULTIFACTOR—Das Automatisationssystem (The Automation System)" of the firm Mikron. While being machined in this rotary transfer machine the workpieces are always located in the clamping means of the rotary indexing table disposed in the centre of the machine. The workpieces are stationary and when being cut are always machined by a rotating tool of the corresponding machining unit, which may be disposed horizontally or vertically. The feed of the machining units is produced under cam control against fixed stops.

Known rotary transfer machines have a high productive capacity. However, because the workpieces are always clamped in a stationary manner in the clamping means of the rotary indexing table and machined by rotating tools, the precision of the workpieces which are produced is limited. In addition, expensive units are required for each turning and recessing operation. Finally, it is often necessary to exchange all the heavy machining units when retooling known rotary transfer machines, which means that a complicated and time-consuming centre adjustment of the units has to be carried out each time. The effects of this disadvantage are particularly obvious in the case of smallish lot sizes.

SUMMARY OF THE INVENTION

The object of the invention is to provide a rotary transfer machine which can be quickly retooled and which enables workpieces to be produced with a high degree of precision.

This object is solved according to the invention in that at least one machining unit comprises a main clamping device for holding a workpiece which can travel in the direction of the longitudinal axis of the corresponding clamping means and rotate about a rotational axis which is coaxial with or parallel to the longitudinal axis of the clamping means, and an auxiliary carrier device with a toolholder for a tool for manipulating or machining the workpiece.

The development according to the invention of the machining unit enables a workpiece to be removed from a corresponding clamping means of the rotary indexing table by the main clamping device and subsequently rotated. The rotating workpiece can then be machined by a tool, for example a turning tool or a recessing device, and subsequently moved back into the clamping means of the rotary indexing table.

As a result of rotating the workpiece during machining, it is possible, e.g. when carrying out turning or recessing operations, due to the rotational symmetry, to achieve greater precision than when machining a stationary workpiece using a rotating tool, as is the case in known rotary transfer machines.

However the machining unit according to the invention also enables a workpiece which is held in a non-rotatable manner in the clamping means of the rotary indexing table to be machined by a rotating tool such as, e.g. a milling cutter or a drill, in the same way as in known rotary transfer machines.

Finally, the machining units of the rotary transfer machine according to the invention also enable the rotational position of the workpiece in the clamping means of the rotary indexing table to be altered.

The main components of the machining units may therefore be disposed at all stations of the rotary indexing table and need not be removed and replaced by another machining unit when changing over to a new part to be machined.

The versatility of the rotary transfer machine according to the invention can be increased if the main clamping device can travel horizontally in a direction perpendicular to the longitudinal axis of the clamping means and in a direction parallel to the rotational axis of the rotary table. An embodiment of this kind enables, for example, a turning tool to be held stationary in the auxiliary carrier device and the workpiece which is firmly clamped and rotating in the main clamping device to be moved relative to the turning tool such that the desired turned contour is achieved.

It is, however, also possible to feed the tool held in the auxiliary carrier device towards the workpiece if the auxiliary carrier device can travel towards the longitudinal axis of the clamping means and away from this axis.

If the auxiliary carrier device can also rotate about its longitudinal axis by means of a drive, holes may also be made at various points of the workpiece by means of a drill held in the toolholder of the auxiliary carrier device, in which case the workpiece can be held both in the clamping means of the rotary indexing table and in the main clamping device.

The possibility of rotating the auxiliary carrier device also enables a workpiece to be turned round if a gripper is disposed at the auxiliary carrier device.

The range of applications of the machining unit can be extended further if the auxiliary carrier device can swivel about an axis which is perpendicular to its direction of travel. This creates the possibility, inter alia, of making diagonal holes in the circumference of a workpiece.

The drive for the individual linear movements of the auxiliary carrier device and the main clamping device is preferably provided by CNC-controlled a.c. servomotors with an integrated absolute measuring system. In order to rotate the main clamping device and the auxiliary carrier device, these are advantageously provided with spindles which are driven by an a.c. hollow-shaft motor and which may also be rotated under CNC control. The opening and closure of the clamping means, of the workpiece holders and toolholders, as well as the travel of the machining unit are also computer-controlled, so that the workpiece machining operations can be programmed in advance, thus enabling the rotary transfer machine to be changed over to a new part to be finished in a relatively short time.

Quick-change hollow shaft cone systems are preferably used to hold the workpieces and tools. It is, however, also possible to use jaw chucks or collet chucks.

If a machining unit of the rotary transfer machine is to be used for broaching, scraping, etc., there is no need for the clamping device to be able to rotate about its longitudinal axis.

BRIEF DESCRIPTION OF THE DRAWINGS

Embodiments of the invention are explained in detail in the following on the basis of drawings, in which.

DETAILED DESCRIPTION OF THE PREFERRED EMBODIMENTS

Figure 1:
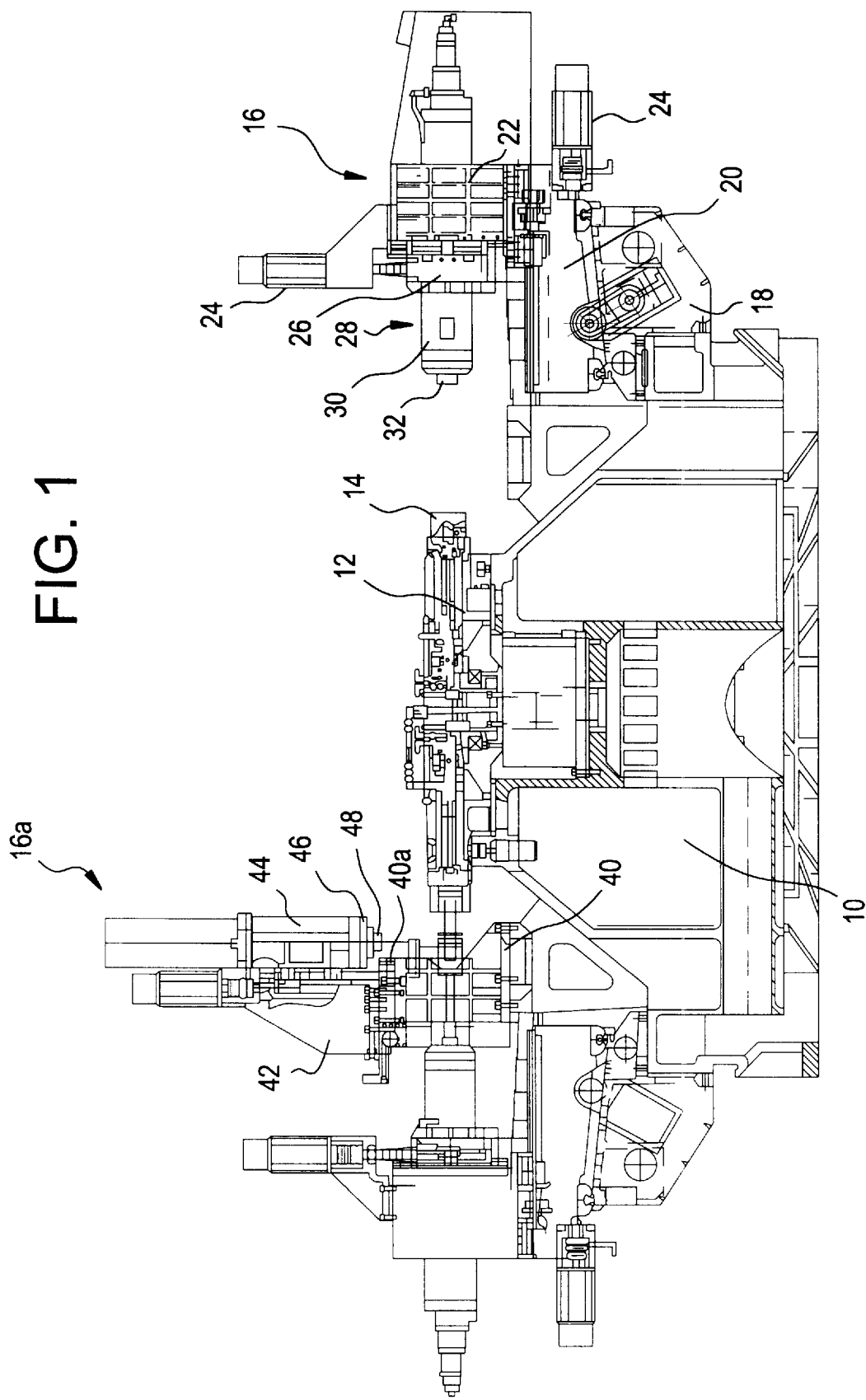
FIG. 1 is a cross section through a rotary transfer machine.
Figure 2:
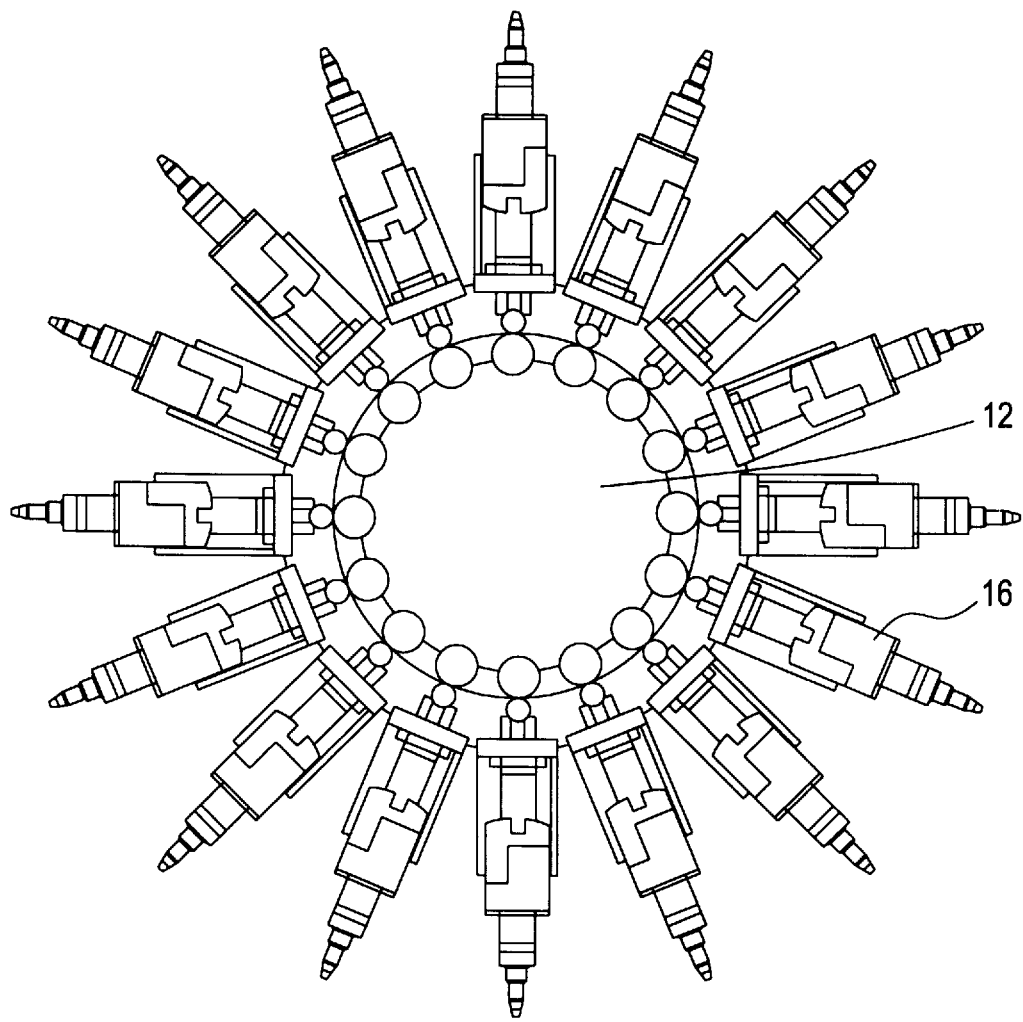
FIG. 2 is a plan view onto the rotary transfer machine of FIG. 1.

The rotary transfer machine shown in FIG. 1 comprises a machine column 10, in the centre of which a rotary indexing table 12, which can rotate about a vertical axis, is mounted, which table is driven stepwise by an a.c. motor. A plurality (sixteen) of clamping means 14 are disposed radially at equal spacings from one another at the outer circumference of the rotary indexing table 12. The clamping means 14 may be automatically opened or closed to release or secure a workpiece.

Figure 3A:
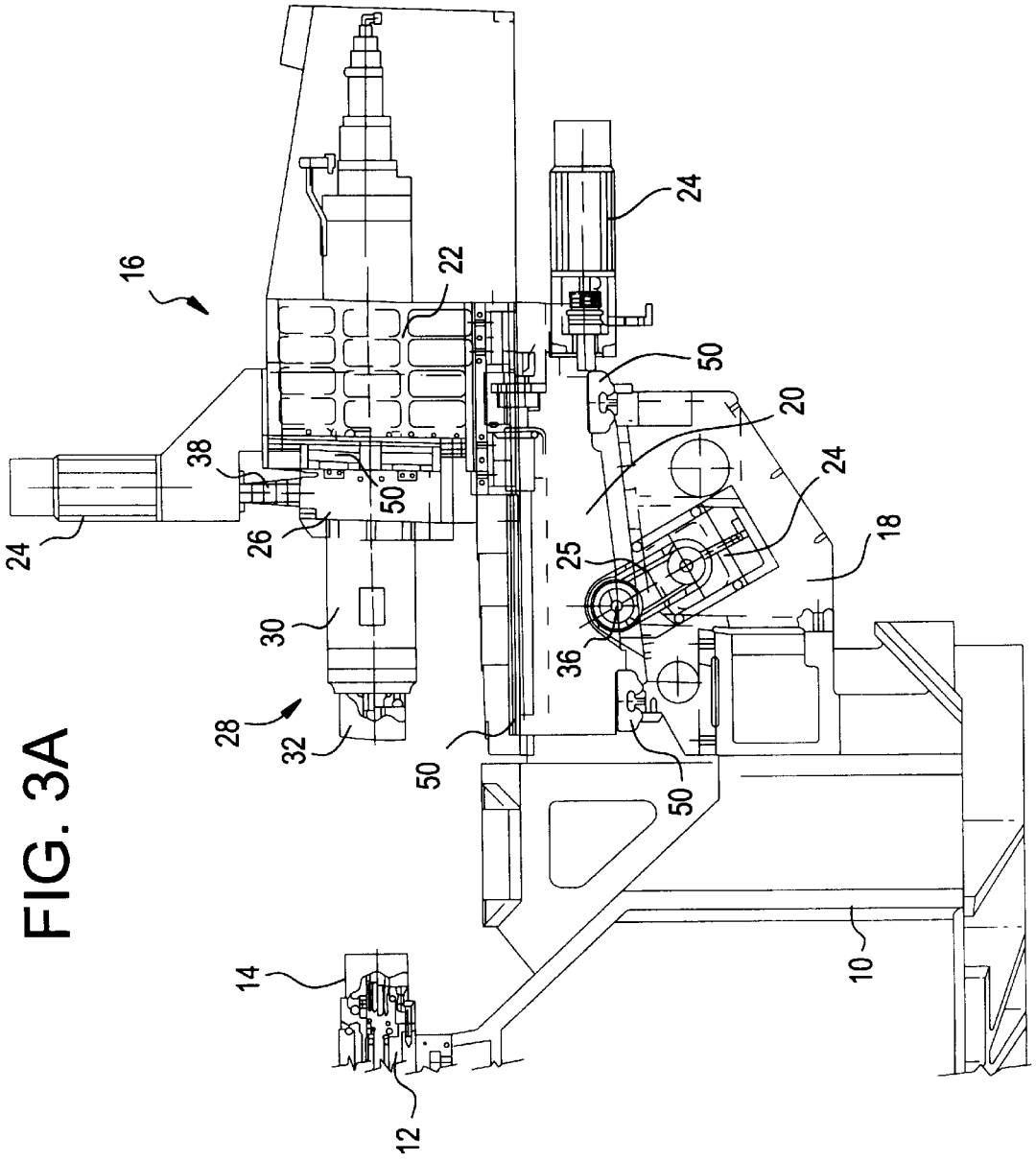
FIG. 3A is a side view of the machining unit of the rotary transfer machine which is on the right-hand side in FIG. 1.

A machining unit 16 is associated with each clamping means 14, being disposed radially outside of and opposite the corresponding clamping means 14. The machining unit 16 which is shown in FIG. 3A consists of a knee 18 which is attached to the machine column 10 and on which a CNC-controllable cross-slide 20, which can move in the X direction, is disposed. A box slide 22 is mounted in a displaceable manner on the cross-slide 20 and can travel in the Z direction, i.e. coaxially with or parallel to the longitudinal axis of the corresponding clamping means 14. A vertical slide 26, which can travel in the Y direction, i.e. vertically, is disposed on the side of the box slide 22 which faces the rotary indexing table 12, which slide 26 bears a main clamping device 28 formed by a main spindle 30 and a chuck 32 provided at the front end thereof.

The rotational axis of the main spindle 30 is coaxial with or parallel to the central longitudinal axis of the corresponding clamping means 14, according to the position of the cross-slide 20 and of the vertical slide 26.

Figure 3B:
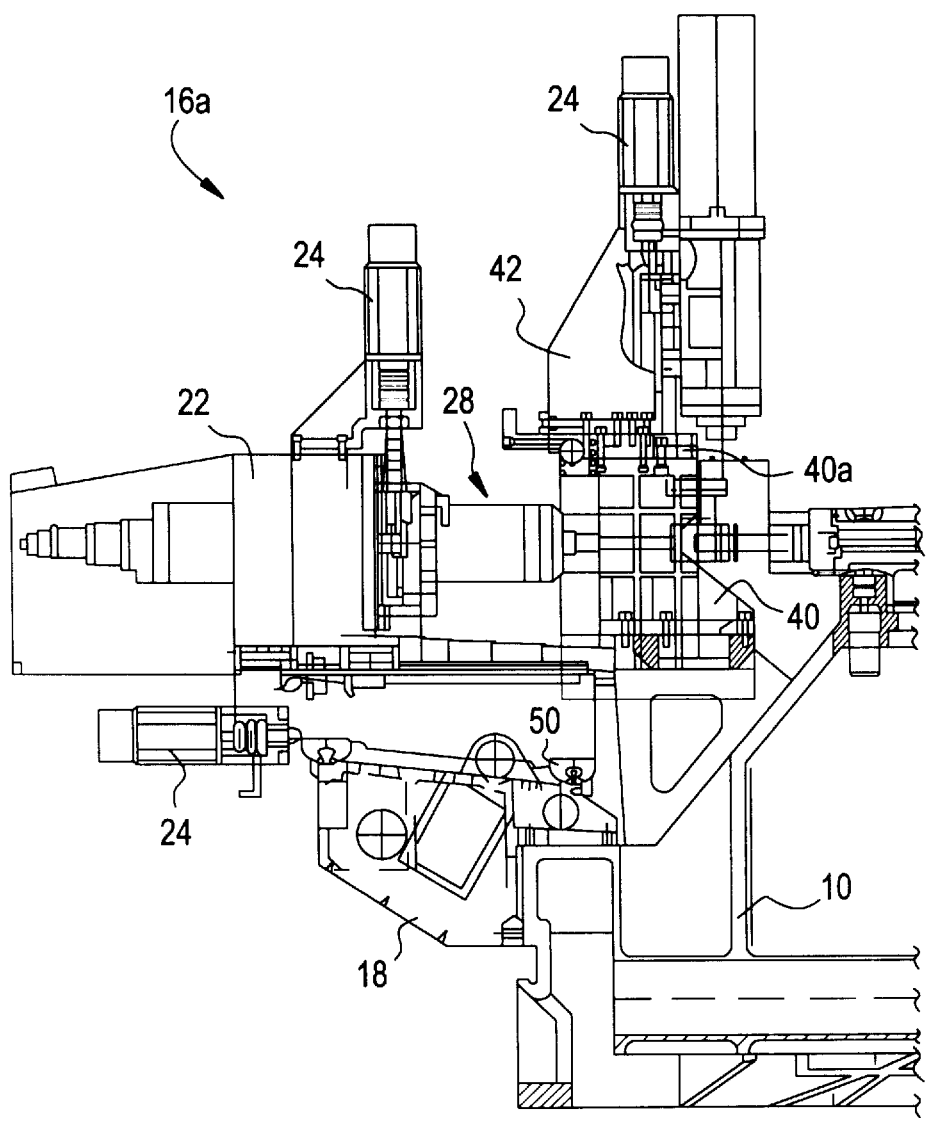
FIG. 3B is a side view of the machining unit of the rotary transfer machine which is on the left-hand side in FIG. 1.
Figure 3C:
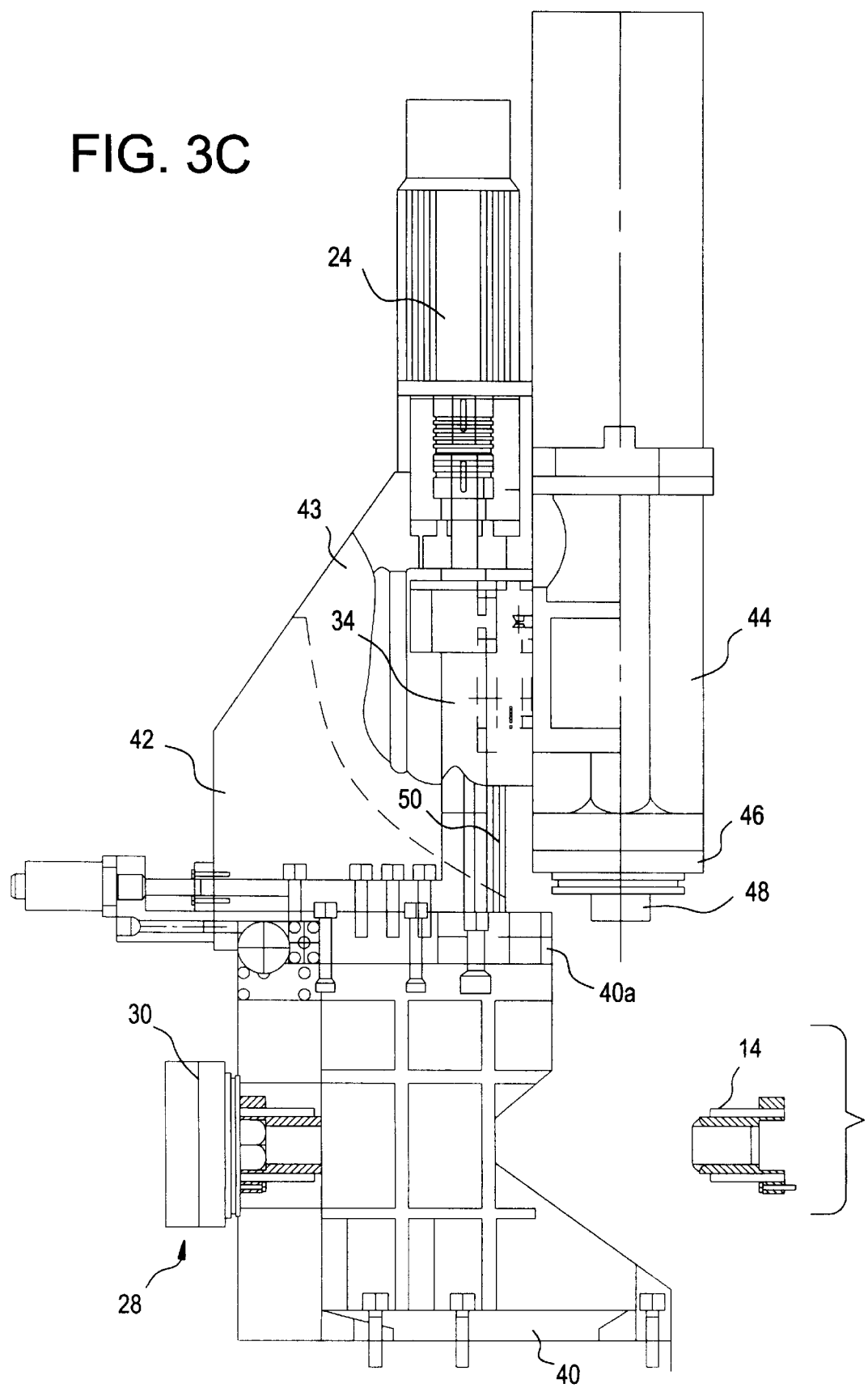
FIG. 3C is a scaled-up view of an auxiliary carrier device of the machining unit of FIG. 3B.

Unlike the machining unit 16, the machining unit 16a shown in FIGS. 3B and 3C additionally comprises at the machine column 10 a bridge 40 which spans the main clamping device 28. A displaceable plate 40a, with which an angle 42 can be manually displaced in the Z direction, is disposed on the top side of the bridge 40.

A swivel device 43, which can be swivelled about a swivel axis extending in the X direction, is disposed above the main spindle 30 on the side of the angle 42 which faces the clamping means 14.

An auxiliary carrier device 44 is guided on the side of the swivel device 43 which faces the clamping means 14 such that it can be moved in a vertical plane in the direction of the main clamping device 28 or away from the latter. The auxiliary carrier device 44 comprises an auxiliary spindle 46 and a toolholder 48, which faces the main clamping device 28.

The linear movements of the cross-slide 20, of the box slide 22, of the vertical slide 26 and of the auxiliary carrier device 44 are effected by means of suitable CNC-controlled a.c. servomotors 24 with an integrated absolute measuring system, so that both a linear and a three-dimensional control of the movement of the main spindle 30 with respect to the clamping means 14 is possible. The servomotors 24 drive the individual slides 20, 22, 26 and 44 via toothed belts 25 and ballscrews 34, 36, 38 (FIG. 3).

An a.c. hollow-shaft motor is used to rotate the main spindle 30 of the main clamping device 28 and the auxiliary spindle 46, which spindle rotation may also be effected under CNC control, in terms of both speed and position.

The individual slides are guided by circulating roller units 50.

By clamping a suitable tool in the chuck 32 of the main spindle 30 and appropriately feeding the main clamping device 28 towards a workpiece firmly clamped in the clamping means 14, the clamped workpiece can be machined in various ways, for example by drilling, reaming, milling, broaching, sawing, etc., as is the case in known rotary transfer machines.

However the structure according to the invention of the machining unit 16 also enables a workpiece to be removed from the clamping means 14 by the main clamping device 28 and rotated by means of the main spindle 30 and the workpiece holder 32. The main clamping device 30 does not therefore just serve to hold the tool, as is the case in known rotary transfer machines, but also to hold a workpiece.

FIGS. 4 to 6 depict various machining units 16 with which various operations can be carried out. The machining units 16 only differ in terms of the construction and adjustability of the auxiliary carrier device 44 mounted on the angle slide 42.

The machining unit 16 shown in diagrammatic form in FIGS. 4A–D corresponds essentially to the machining unit of FIG. 3. A drill 56 is clamped in the toolholder 48 of the auxiliary carrier device 44. This machining unit 16 enables diagonal holes and straight holes to be made in the workpiece 54 clamped in the clamping means 14 as follows.

Figure 4A:
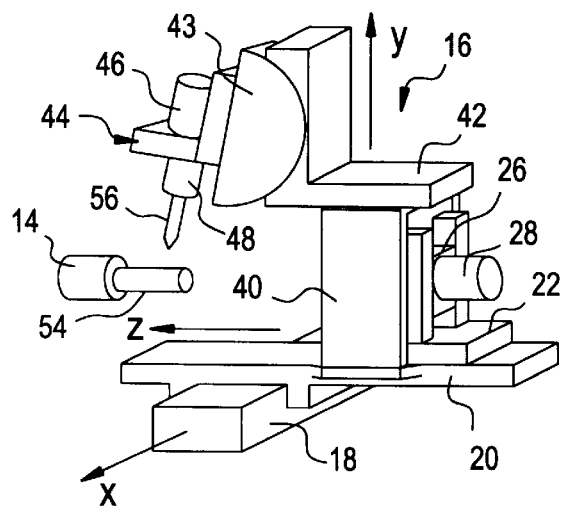
FIGS. 4A to 4D are diagrammatic views showing the structure of a machining unit for making diagonal holes.
Figure 4B:
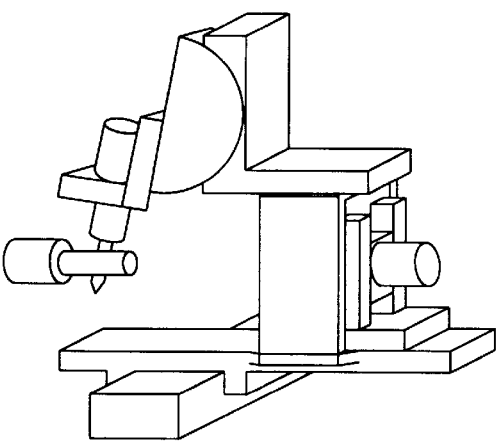
Figure 4C:
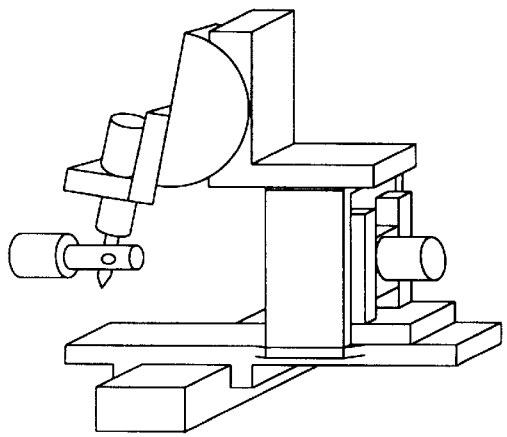

The drill 56 is in the starting position above the workpiece 54 firmly clamped in the clamping means 14 (FIG. 4A). The angle of the diagonal hole is set by appropriately swivelling the swivel device 43 together with the auxiliary carrier device 44. The auxiliary spindle 46 of the auxiliary carrier device 44 is then rotated and the auxiliary carrier device 44 is moved together with the drill 56 in linear fashion along the swivel device 43 in the direction of the workpiece 54 and the latter is drilled (FIG. 4B).

Figure 4D:
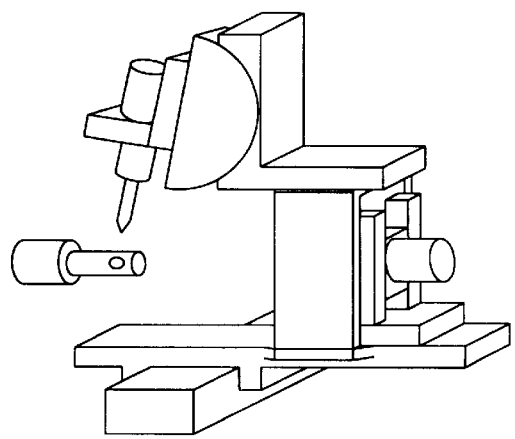

After the first diagonal hole has been made the auxiliary carrier device 44 is moved in the opposite direction until the drill 56 is outside of the workpiece 54. The main clamping device 28 is now controlled so that it grips the workpiece 54 with the chuck 32. The clamping means 14 is now opened and the workpiece 54 turned through a predetermined angle by the main clamping device 28. The clamping means 14 is closed and the main clamping device 28 moved back into its starting position. Another diagonal hole is then made in the workpiece 54 as described above (FIG. 4C) and the drill 56 subsequently moved back out of the workpiece 54 into the starting position (FIG. 4D).

The machining unit shown in FIGS. 5A to 5F differs from the machining unit shown in FIGS. 4A to 4D in that the auxiliary carrier device 44 can only travel in the Y direction. There is no possibility of the auxiliary carrier device 44 swivelling.

A clamping gripper 58 for gripping the workpiece 54 is provided in the toolholder 48 of the auxiliary carrier device. The workpiece 54 can be turned round by means of the machining unit 16 thus equipped.

Figure 5A:
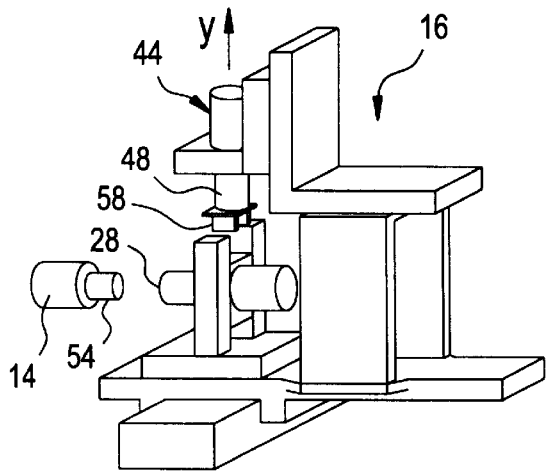
FIGS. 5A to 5F are diagrammatic views showing the structure of a machining unit for carrying out a turning-round operation.
Figure 5B:
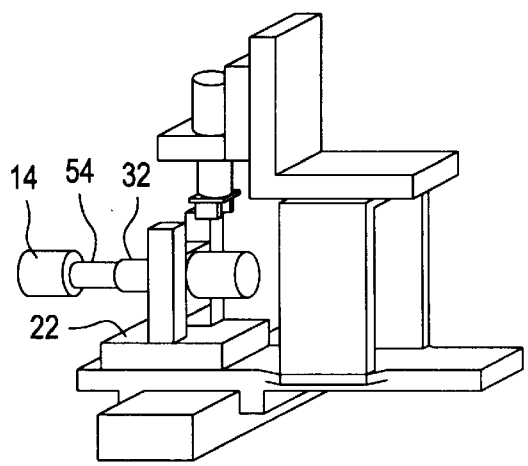
Figure 5C:
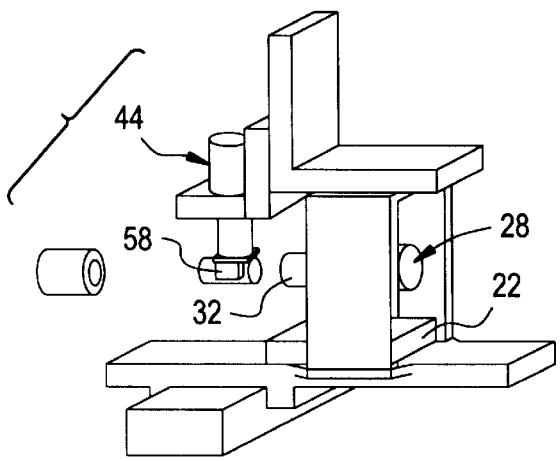
Figure 5D:
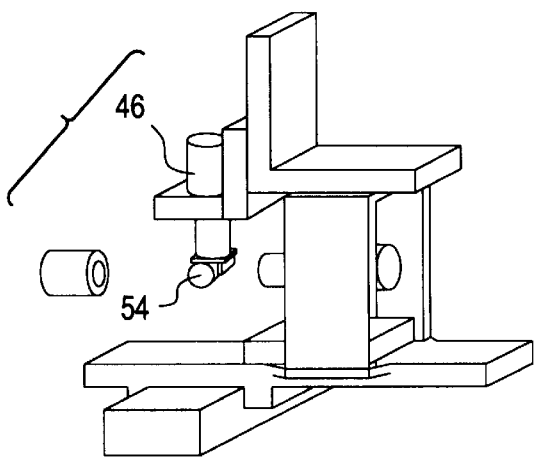

The clamping gripper 58 is above the main clamping device 28 in the starting position (FIG. 5A). The main clamping device 28 is then moved in the direction of the workpiece 54 and the workpiece 54 is gripped by the chuck 32 (FIG. 5B). The clamping means 14 is subsequently disengaged and the workpiece 54 moved under the clamping gripper 58 by moving the box slide 22 together with the main clamping device 28 in the Z direction. The auxiliary carrier device 44 is then moved downwards with the clamping gripper 58 until the clamping gripper 58 grips the workpiece 54. The main clamping device 28 could alternatively be moved upwards. The chuck 32 is now disengaged and the main clamping device 28 moved away from the workpiece 54 held by the clamping gripper 58. The auxiliary spindle 46 is now rotated and rotates the workpiece 54 through 180° (FIG. 5D). Following this rotation the main clamping device 28 is again moved in the direction of the workpiece 54 and grips the workpiece 54 with the chuck 32.

Figure 5E:
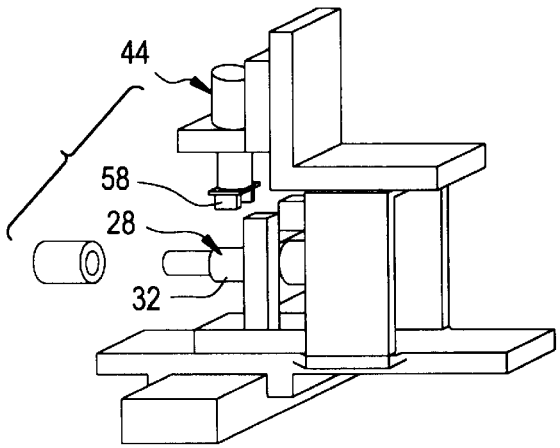
Figure 5F:
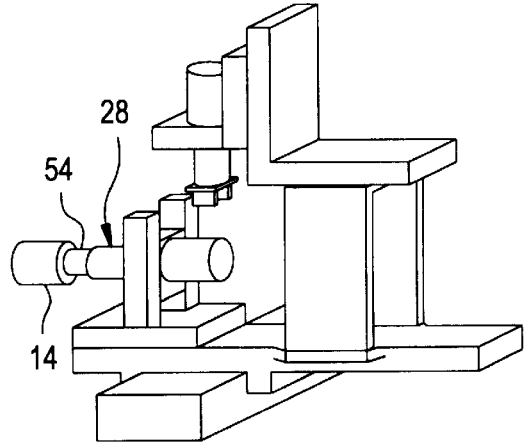

The auxiliary carrier device 44 is now returned to its starting position, so that the clamping gripper 58 releases the workpiece 54 (FIG. 5E). The main clamping device 28 is then moved in the direction of the clamping means 14 again and delivers the workpiece 54 to the clamping means 14 (FIG. 5F).

The machining unit shown in FIGS. 6A to 6D differs from the machining units shown in FIGS. 4 and 5 in that the auxiliary carrier device 44 cannot travel in linear fashion or swivel about a swivel axis extending in the X direction, but can swivel about a swivel axis extending in the Z direction. A turning tool 60 is disposed in the toolholder 48 of the auxiliary carrier device 44. The turning tool 60 can be swivelled out of a rest position, in which it is disposed in the X direction, into a machining position, in which its shank extends in the Y direction and the cutting edge points downwards.

In order to carry out turning work on a workpiece 54, the cross-slide 20, the box slide 22 and the vertical slide 26 are moved such that the central longitudinal axis of the main clamping device 28 is axial with respect to the central longitudinal axis of the clamping means 14, in which a workpiece 54 is held.

Figure 6A:
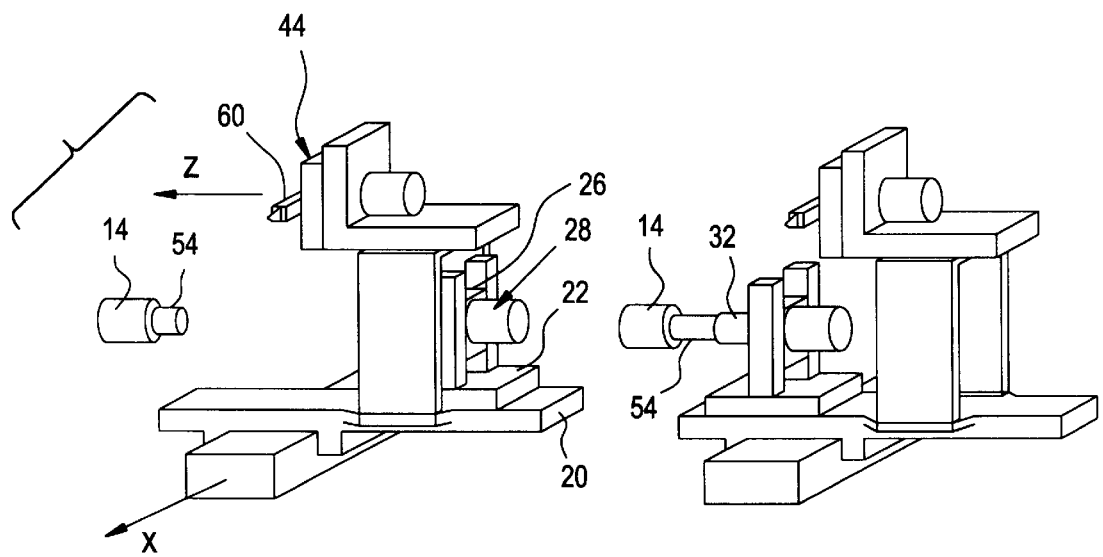
FIGS. 6A to 6D show the structure of a machining unit for carrying out a turning operation.
Figure 6B:
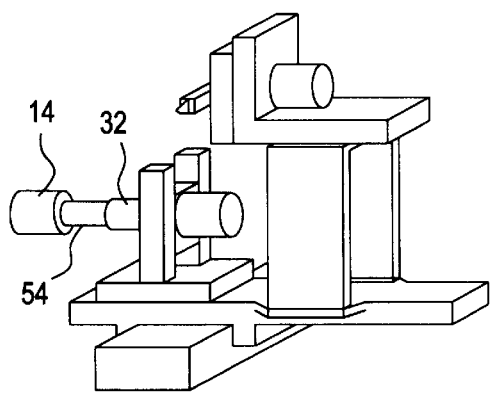

The chuck 32 of the main clamping device 28 is then opened and the main clamping device 28 moved in the Z direction towards the clamping means 14 until the workpiece 54 at least partly enters the chuck 32. The chuck 32 is now closed to hold the workpiece 54 and the clamping means 14 opened (FIG. 6B).

Figure 6C:
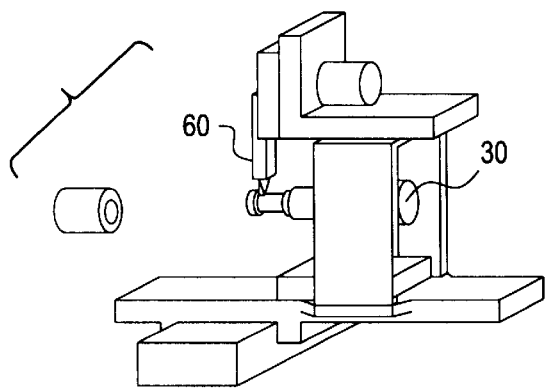
Figure 6D:
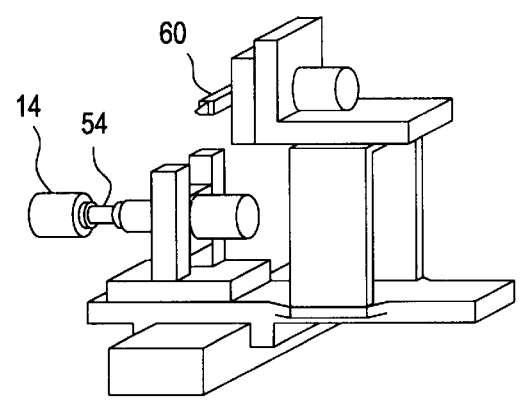

The main clamping device 28 is subsequently moved together with the workpiece 54 in the Y and the Z direction into a suitable position below the turning tool 60, and the main spindle 30 is rotated. The turning tool 60 is now swivelled into the machining position and the main clamping device 28 moved in the Y and the Z direction until the workpiece 54 comes into contact with the turning tool 60. Further movement of the main clamping device 28 takes place in accordance with the desired turned contour of the workpiece 54 (FIG. 6C). As soon as the desired turned contour is achieved, the turning tool 60 is swivelled back into its rest position, the rotation of the main spindle 30 is stopped and the workpiece 54 moved back into the clamping means 14 (FIG. 6D). The clamping means 14 is now closed, the chuck 32 opened and the main clamping device 28 returned to the initial position.

Turning operations may also be carried out with the machining units according to FIGS. 4 and 5 if the turning tool 60 is clamped in the auxiliary carrier devices 44 of these units. The machining unit of FIG. 4 may also be used for the turning-round function of the machining unit of FIG. 5.

We claim:

1. Rotary transfer machine for machining a workpiece using fixed-cycle control, with a centrally disposed rotary indexing table which is driven according to a fixed cycle, is mounted to rotate about a vertical axis and at the outer circumference of which a plurality of clamping means rotatable about a longitudinal axis for holding a workpiece are disposed radially at a spacing from one another, and a plurality of machining units for machining the workpieces, which units are disposed around the outer circumference of the rotary table such that they lie substantially opposite corresponding clamping means in an indexed position of the rotary indexing table, at least one machining unit comprising a main clamping device for holding a workpiece which is mounted to travel in the direction of the longitudinal axis of the corresponding clamping means and rotate about a rotational axis which is coaxial with or parallel to the longitudinal axis of the clamping means, and an auxiliary carrier device with a toolholder for a tool for manipulating or machining the workpiece.

2. Rotary transfer machine according to claim 1, wherein the main clamping device is mounted to travel horizontally in a direction perpendicular to the longitudinal axis of the clamping means.

3. Rotary transfer machine according to claim 1, wherein the main clamping device is mounted to travel in a direction parallel to the rotational axis of the rotary table.

4. Rotary transfer machine according to claim 1, wherein the auxiliary carrier device is mounted to travel towards the central longitudinal axis of the corresponding clamping means and away from this axis.

5. Rotary transfer machine according to claim 4, wherein the auxiliary carrier device is mounted to rotate about its longitudinal axis by means of a driven auxiliary spindle.

6. Rotary transfer machine according to claim 4, wherein the auxiliary carrier device is mounted to swivel about an axis which is perpendicular to its direction of travel.

7. Rotary transfer machine according to claim 5, wherein a gripping device for gripping a workpiece is held in the toolholder of the auxiliary carrier device.

8. Rotary transfer machine according to claim 1, wherein a turning tool is held in the toolholder of the auxiliary carrier device.

9. Rotary transfer machine according to claim 5, wherein a drill is held in the toolholder of the auxiliary carrier device.

10. Rotary transfer machine according to claim 1, wherein a tool is held in the main clamping device.

* * * * *